US008832130B2

(12) United States Patent
Doddavula et al.

(10) Patent No.: US 8,832,130 B2
(45) Date of Patent: Sep. 9, 2014

(54) SYSTEM AND METHOD FOR IMPLEMENTING ON DEMAND CLOUD DATABASE

(75) Inventors: Shyam Kumar Doddavula, Karnataka (IN); Abhishek Pratap Singh, Rajasthan (IN)

(73) Assignee: Infosys Limited (IN)

( * ) Notice: Subject to any disclaimer, the term of this patent is extended or adjusted under 35 U.S.C. 154(b) by 0 days.

(21) Appl. No.: 12/902,298

(22) Filed: Oct. 12, 2010

(65) Prior Publication Data

US 2012/0047107 A1 Feb. 23, 2012

(51) Int. Cl.
*G06F 17/30* (2006.01)
*G06F 9/50* (2006.01)

(52) U.S. Cl.
CPC *G06F 17/30575* (2013.01); *G06F 2209/50199* (2013.01); *G06F 9/5083* (2013.01)
USPC ............................. 707/759; 707/769; 707/770

(58) Field of Classification Search
USPC .......................................... 707/759, 769, 770
See application file for complete search history.

(56) References Cited

U.S. PATENT DOCUMENTS

| 2005/0125414 | A1* | 6/2005 | Navas et al. ..................... 707/10 |
| 2005/0267929 | A1 | 12/2005 | Kitamura |
| 2006/0136448 | A1 | 6/2006 | Cialini et al. |
| 2007/0118663 | A1* | 5/2007 | Nguyen ........................ 709/228 |
| 2009/0019007 | A1 | 1/2009 | Niina |
| 2009/0100180 | A1 | 4/2009 | Chidambaran et al. |
| 2009/0157641 | A1 | 6/2009 | Andersen et al. |
| 2009/0182767 | A1 | 7/2009 | Meadway et al. |
| 2010/0088150 | A1 | 4/2010 | Mazhar et al. |
| 2011/0078303 | A1* | 3/2011 | Li et al. .......................... 709/224 |
| 2011/0208695 | A1* | 8/2011 | Anand et al. ................... 707/610 |
| 2011/0295999 | A1* | 12/2011 | Ferris et al. .................... 709/224 |

* cited by examiner

*Primary Examiner* — Khanh Pham
(74) *Attorney, Agent, or Firm* — Cantor Colburn LLP

(57) ABSTRACT

A method for dynamic management of one or more cloud database nodes is provided. The method enables gathering information related to usage of one or more cloud database nodes. The method further enables comparing time required by the one or more cloud database nodes for responding to one or more requests with a predetermined threshold. Furthermore, the method enables provisioning one or more new cloud database nodes or removing one or more new cloud database nodes based on at least one of: the gathered information, the comparison and a combination thereof.

20 Claims, 5 Drawing Sheets

SYSTEM AND METHOD FOR IMPLEMENTING ON DEMAND CLOUD DATABASE

FIELD OF THE INVENTION

The present invention relates to on demand databases and more specifically to provide a system and method for implementing a cloud database that can be provisioned or removed on demand.

BACKGROUND OF THE INVENTION

The advent and progression of information technology has resulted in proliferation of data and there is a continuous demand to store and retrieve content. Various applications such as user generated content in community portals, emails and other web applications, call log files generated at call centers, inventory managements systems, Enterprise Resource Planning (ERP) systems etc. results in huge amount of data. The data generated by the abovementioned processes needs to be stored in an efficient way so that it can be quickly retrieved whenever there is a need. As a result, there is an increasing demand for storing, processing, and retrieving huge amount of data.

Various conventional Relational Database Management Systems (RDBMS) are used to cater to the increasing demand of data but due to inherent limitation theses databases cannot be scaled horizontally and therefore, there is a need to store data on demand. Various key value data stores which are used to deal with the abovementioned limitation of horizontal scalability works on the premises that rather than providing Structured Query Language (SQL) based interface, map interface should be provided so that traditional enterprise applications can be served.

In light of abovementioned disadvantages, there is a need for a system and method for implementing a database that can be provisioned or removed on demand. In addition, there is a need for database that can be scaled horizontally. Also, a system and method for implementing a cloud database is required which provides high scalability, availability, performance and have low latency.

SUMMARY OF THE INVENTION

A method for dynamic management of one or more cloud database nodes is provided. In various embodiments of the present invention, the method comprises, firstly, gathering information related to usage of one or more cloud database nodes. Secondly, the method comprises comparing time required by the one or more cloud database nodes for responding to one or more requests with a predetermined threshold. The method further comprises provisioning one or more new cloud database nodes or removing one or more new cloud database nodes based on at least one of: the gathered information, the comparison and a combination thereof.

In an embodiment of the present invention, gathering information related to usage of one or more cloud database nodes comprises gathering information on current usage of one or more cloud database nodes and gathering information on future usage of one or more cloud database nodes. In an embodiment of the present invention, the current usage information comprises at least one of number of entities stored in the one or more cloud database nodes and number of requests received at the one or more cloud database nodes. In another embodiment of the present invention, the future usage information comprises at least one of number of entities expected to be stored in the one or more cloud database nodes and number of requests expected to be received at the one or more cloud database nodes.

In an embodiment of the present invention, comparing time required by the cloud database nodes for responding to one or more requests with a predetermined threshold comprises determining if time required for responding to one or more requests by the cloud database nodes is less than a predetermined threshold. In an embodiment of the present invention, provisioning one or more cloud database nodes based on the gathered information, comparison and combination thereof comprises adding one or more cloud database node instances using a cloud provider application API. In another embodiment of the present invention, comparing time required by the cloud database nodes for responding to one or more requests with a predetermined threshold comprises determining if time required for responding to one or more requests by the cloud database nodes is more than the predetermined threshold. In yet another embodiment of then present invention, removing one or more cloud database nodes based on the gathered information, comparison and combination thereof comprises deleting one or more cloud database node instances using a cloud provider application API. In another embodiment of the present invention, comparing time required by the cloud database nodes for responding to one or more requests with a predetermined threshold comprises determining if time required for responding to one or more requests by the cloud database nodes is equal to the predetermined threshold. In an embodiment of the present invention, the predetermined threshold comprises at least one of: response time threshold, throughput threshold and resource utilization threshold.

In an embodiment of the present invention, the one or more cloud database nodes comprises cloud database node instances and cloud database server instances. In an embodiment of the present invention, the method further comprises updating a routing module with information related to the provisioning or removal of one or more cloud database nodes.

In an embodiment of the present invention, the method further comprises repartitioning entities across provisioned and existing cloud database node instances. The repartitioning ascertains even distribution of entities across the node instances. In another embodiment of the present invention, the method further comprises replicating entities across provisioned and existing cloud database node instances. In yet another embodiment of the present invention, the method further comprises versioning entities across provisioned and existing cloud database node instances.

A method for interacting with dynamically scaled cloud database architecture is provided. In various embodiments of the present invention, the method comprises, firstly, receiving one or more requests by a cloud database client. Secondly, the method comprises converting the one or more requests to a query language format. The method further comprises locating one or more cloud database server instances. Furthermore, the method comprises sending the converted data to at least one of the located cloud database server instance. Further, the method comprises processing the one or more requests converted to the query language format received at the cloud database server instance. The method further comprises sending the one or more requests to one or more cloud database nodes instances and processing one or more results received from the one or more cloud database node instances. Finally, the method comprises sending the one or more results to the cloud database client.

In an embodiment of the present invention, converting the one or more requests to a query language format comprises capturing the one or more requests in a query object. In another embodiment of the present invention, locating one or more cloud database server instances comprises locating at least one of: existing cloud database server instances and provisioned cloud database server instances. In yet another embodiment of the present invention, sending the converted data to at least one of the located cloud database server instance comprises serializing the converted data into a sequence of bits. In an embodiment of the present invention, processing the one or more requests converted in the query language format received at the cloud database server instance comprises deserializing the sequence of bits to obtain the converted data, interpreting the one or more requests converted to the query language format and determining one or more cloud database node instances for processing the requests based on the interpretation. The one or more cloud database node instances comprise provisioned or existing nodes.

In an embodiment of the present invention, sending the one or more requests to one or more cloud database node instances comprises at least one of: routing the one or more requests to a corresponding cloud database node instance and routing the one or more requests to one or more cloud database node instances via one or more other cloud database server instances. In another embodiment of the present invention, processing results received from the one or more cloud database server instances comprises aggregating results corresponding to the one or more requests received from the one or more cloud database server instances.

A system for dynamic management of one or more cloud database nodes is provided. In various embodiments of the present invention, the system comprises a cloud database management console configured to facilitate a user to at least in part gather information related to usage of one or more cloud database node instances and to monitor response time of services provided by the one or more cloud database node instances. The system further comprises a cloud infrastructure module configured to facilitate provisioning or removal of one or more cloud database node instances using the cloud database management console.

In an embodiment of the present invention, the cloud database management console comprises a web based user interface configured to receive one or more requests. In another embodiment of the present invention, the cloud database management console comprises one or more software modules configured to facilitate addition and/or deletion of one or more cloud database node instances using a cloud provider Application Programming Interface (API).

A system for facilitating interaction with dynamically scaled cloud database architecture is provided. In various embodiments of the present invention, the system comprises a cloud database client configured to receive and convert one or more requests to a query language format. The system further comprises a cloud database server configured to receive the query language format from the cloud database client and process the query language format. Furthermore, the system comprises one or more cloud database node instances configured to provide one or more results corresponding to the one or more requests via the cloud database server and/or other cloud database server instances.

In an embodiment of the present invention, the cloud database client comprises a query store client that receives and converts one or more requests to a query language format using a Java Persistence API (Application Programming Interface) Adaptor. In another embodiment of the present invention, the cloud database client comprises a Serialization De-Serialization module configured to translate the converted data into a sequence of bits and send the sequence of bits to the cloud database server over a network.

In another embodiment of the present invention, the cloud database client comprises an Inconsistency Resolver configured to resolve inconsistencies in one or more results received from the cloud database server. In yet another embodiment of the present invention, the Inconsistency Resolver comprises a Resolve by Identification (Id) module configured to resolve inconsistencies in one or more results by updating version identification numbers associated with entities stored in the one or more cloud database node instances. In another embodiment of the present invention, the Inconsistency Resolver comprises a Resolve by Time module configured to resolve inconsistencies in one or more results by identifying latest version of entities stored in the one or more cloud database node instances based on modified time information associated with the entities.

In an embodiment of the present invention, the cloud database server is configured to send the one or more requests to one or more other cloud database server instances. In another embodiment of the present invention, the cloud database server comprises a Query Processor configured to interpret the one or more requests converted to the query language format. In an embodiment of the present invention, the Query Processor comprises Query by Identification module configured to interpret the one or more requests when identity of entities associated with the requests is predetermined. In another embodiment of the present invention, the Query Processor comprises Query by Criteria module configured to interpret the one or more requests based on selection criteria created using one or more characteristics of the one or more requests.

In an embodiment of the present invention, the cloud database server comprises a routing module configured to repartition entities across one or more of the existing and provisioned cloud database node instances. In another embodiment of then present invention, the cloud database server comprises a routing module configured to replicate entities across one or more of the existing and provisioned cloud database node instances.

A computer program product for dynamic management of one or more cloud database nodes is provided. In various embodiments of the present invention, the computer program product comprises program instruction means for gathering information related to usage of one or more cloud database nodes. The computer program product further comprises program instruction means for comparing time required by the one or more cloud database nodes for responding to one or more requests with a predetermined threshold. Furthermore, the computer program product comprises program instruction means for provisioning one or more new cloud database nodes or removing one or more new cloud database nodes based on at least one of: the gathered information, the comparison and a combination thereof.

A computer program product for interacting with dynamically scaled cloud database architecture is provided. In various embodiments of the present invention, the computer program product comprises program instruction means for receiving one or more requests by a cloud database client. The computer program product further comprises program instruction means for converting the one or more requests to a query language format. Further, the computer program product comprises program instruction means for locating one or more cloud database server instances. The computer program product further comprises program instruction means for sending the converted data to at least one of the located cloud database server instance. The computer program product comprises program instruction means for processing the one or more requests converted to the query language format received at the cloud database server instance. The computer program product comprises program instruction means for sending the one or more requests to one or more cloud database nodes instances. Further, the computer program product comprises program instruction means for processing one or more results received from the one or more cloud database node instances and program instruction means for sending the one or more results to the cloud database client.

BRIEF DESCRIPTION OF THE ACCOMPANYING DRAWINGS

The present invention is described by way of embodiments illustrated in the accompanying drawings wherein.

Figure 4:
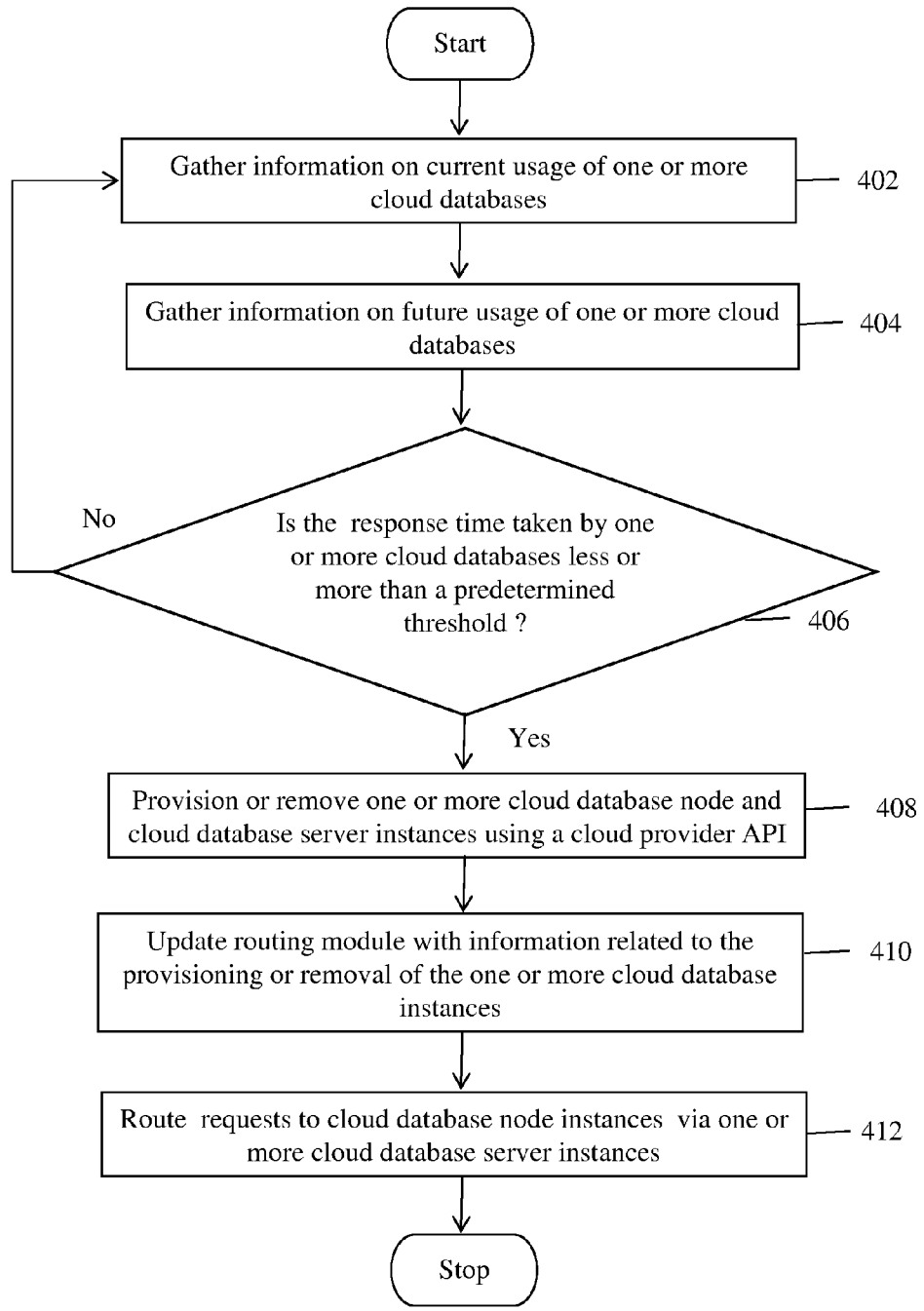
Figure 5:
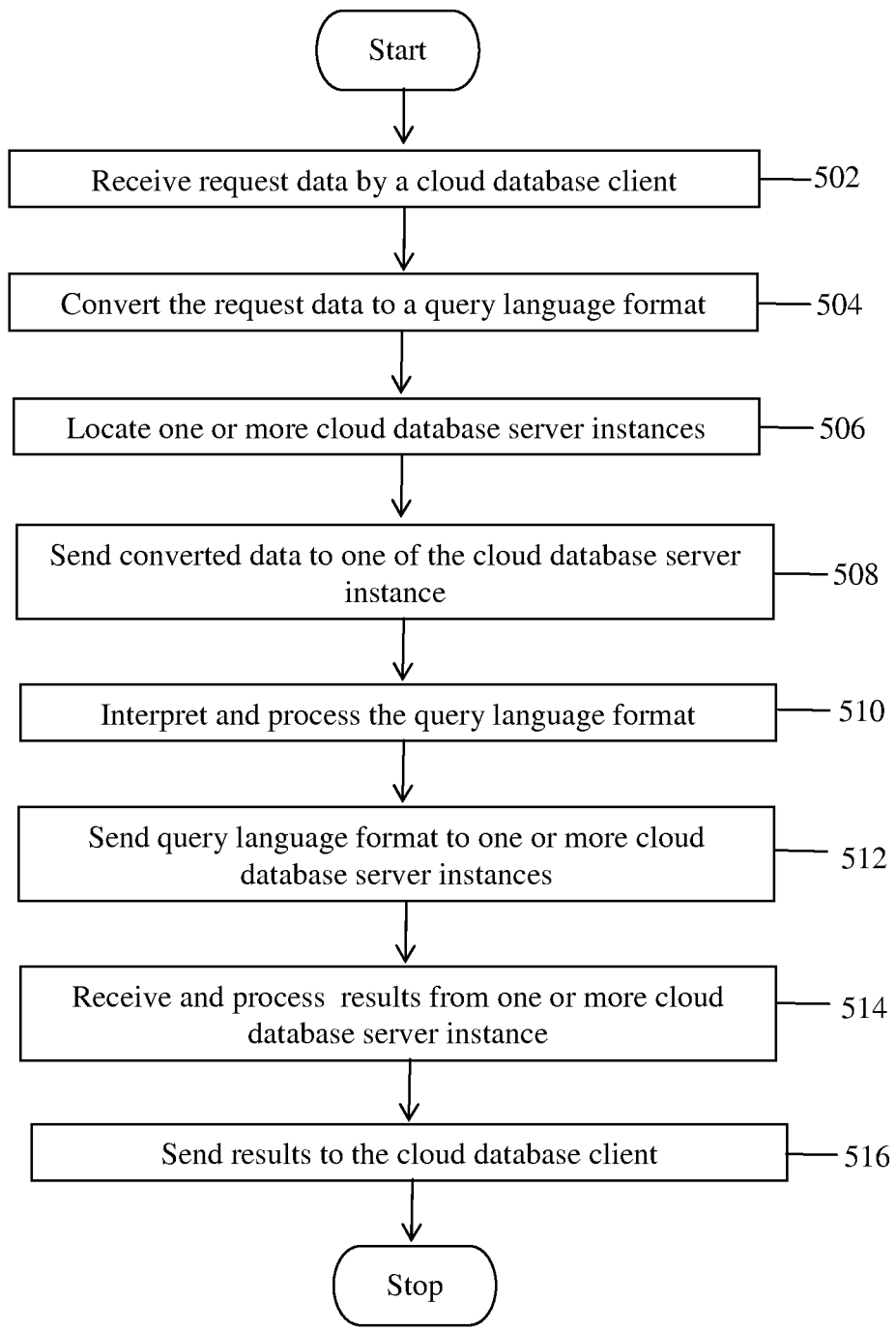

FIG. 4 is a flowchart illustrating a method for dynamic management of one or more cloud database nodes and routing of requests to the one or more cloud database nodes, in accordance with an embodiment of the present invention; and FIG. 5 is a flowchart illustrating a method for interacting with cloud database implementation that supports standard application programming interface (API), in accordance with an embodiment of the present invention.

DETAILED DESCRIPTION OF THE INVENTION

A system and method for implementing on demand cloud database is provided. The invention provides for provisioning or removing various cloud database nodes based on magnitude of data. The invention facilitates adding cloud database nodes when space is required for storing and quickly retrieving large amounts of data. The invention facilitates distributing data across the various cloud database nodes and also replicating data across various cloud database nodes. The invention also facilitates caching of data efficiently which in turn reduces latency in service response time.

The disclosure is provided in order to enable a person having ordinary skill in the art to practice the invention. Exemplary embodiments herein are provided only for illustrative purposes and various modifications will be readily apparent to persons skilled in the art. The general principles defined herein may be applied to other embodiments and applications without departing from the spirit and scope of the invention. The terminology and phraseology used herein is for the purpose of describing exemplary embodiments and should not be considered limiting. Thus, the present invention is to be accorded the widest scope encompassing numerous alternatives, modifications and equivalents consistent with the principles and features disclosed herein. For purpose of clarity, details relating to technical material that is known in the technical fields related to the invention have been briefly described or omitted so as not to unnecessarily obscure the present invention.

The present invention would now be discussed in context of embodiments as illustrated in the accompanying drawings.

Figure 1:
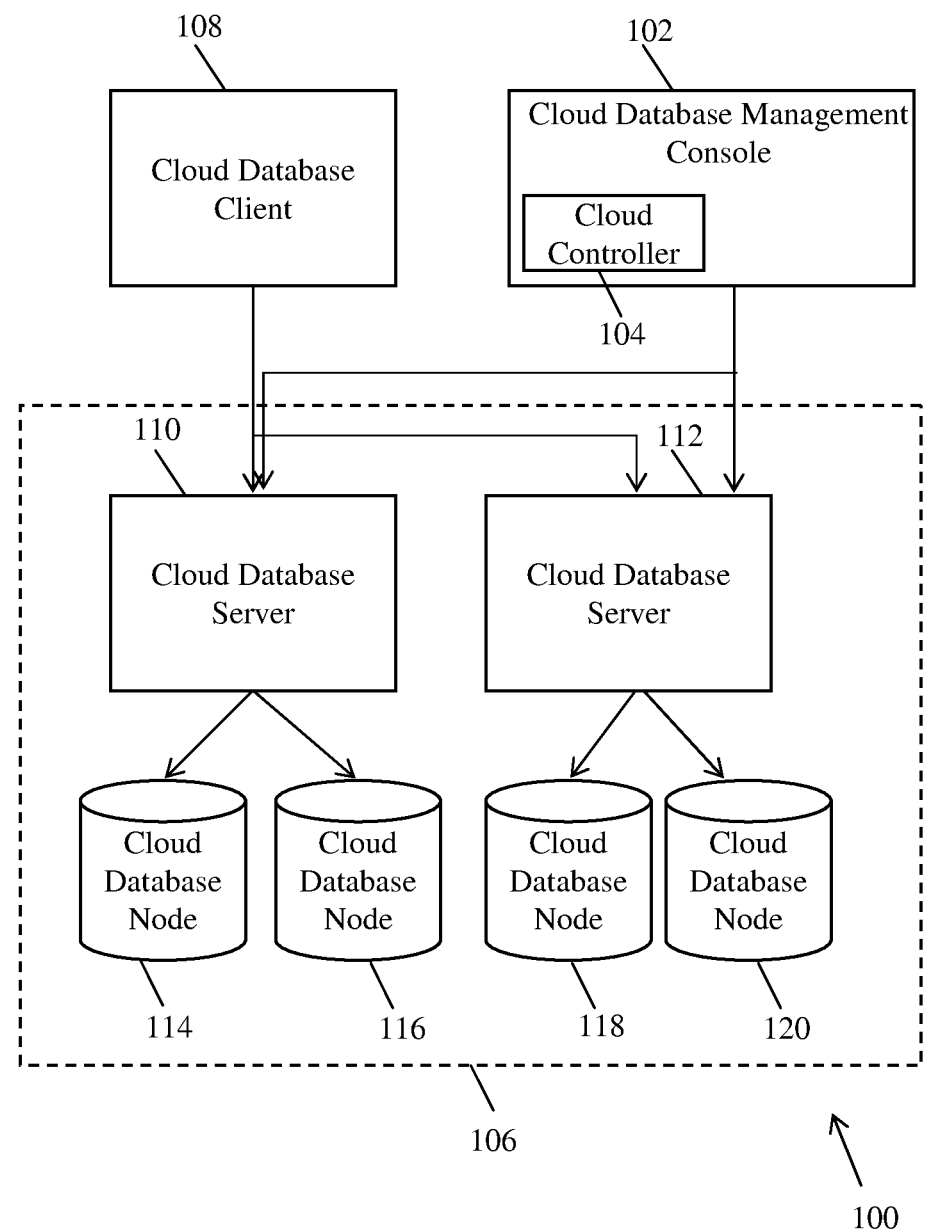
FIG. 1 illustrates an architectural diagram of a cloud database solution in accordance with an embodiment of the present invention.

FIG. 1 illustrates an architectural diagram of a cloud database solution in accordance with an embodiment of the present invention. The cloud database solution architecture 100 comprises a cloud database management console 102, a cloud infrastructure module 106, a cloud database client 108, one or more cloud database servers 110, 112 and one or more cloud database nodes 114, 116, 118, 120. In an embodiment of the present invention, the cloud database servers 110, 112 and cloud database nodes 114, 116, 118, 120 are served by the cloud infrastructure module 106. The cloud database management console 102 further comprises a cloud controller 104.

The cloud database management console 102 provides a web based user interface for provisioning or removal of new instances of cloud database nodes and for expanding the storage capacity. In various embodiments of the present invention, a graphical user interface is provided to enable a user to add cloud database node instances to an existing cloud database cluster or delete cloud database node instances from the existing cloud database cluster. In an embodiment of the present invention, the cloud database management console 102 comprises a cloud controller 104 which is used to monitor consumption and availability of cloud database resources. In another embodiment of the present invention, the cloud controller 104 is used to monitor response time of services provided by the cloud database resources. The cloud database management console 102 facilitates handling on-time warnings and accurate capacity management of the cloud database cluster.

The cloud infrastructure module 106 comprises various software modules that facilitate provisioning or removal of new cloud database node instances which is carried out via the cloud database management console 102. In an embodiment of the present invention, the cloud infrastructure module 106 facilitates addition, deletion, initialization, and management of new cloud database node instances. In an embodiment of the present invention, addition modules are used to append various cloud database nodes as and when need arises. In another embodiment of the present invention, initialization modules are used to initialize various cloud database nodes whenever there is a need to store data after addition of nodes. In another embodiment of the present invention, the deletion modules are used to delete various cloud database nodes as and when need arises. In an embodiment of the present invention, the software modules form a part of a cloud provider Application Programming Interface (API). The cloud provider API provides an abstraction from cloud providers internal API and uses the software modules for implementing infrastructure for the cloud database solution architecture 100. In an embodiment of the present invention, the various software modules may be implemented by performing virtualization of physical hardware of the cloud database solution architecture 100. In an exemplary embodiment of the present invention, open source cloud computing framework such as Eucalyptus may be used for performing virtualization of the physical hardware employing Xen virtualization platform.

The cloud database client 108 provides a standardized interface such as Java Persistence API (JPA) or Structured Query Language (SQL) interface to the cloud database. In an embodiment of the present invention, the cloud database client 108 provides an interface for receiving requests to store entities in the cloud database nodes. In another embodiment of the present invention, the cloud database client 108 provides an interface to update and delete entities stored in the cloud database nodes. In yet another embodiment of the present invention, the cloud database client 108 provides an interface to retrieve entities stored in the cloud database nodes. The cloud database client 108 converts the request to a standard query language format and sends it to the cloud database server 110, 112 over a network.

The cloud database server 110, 112 processes the request and interacts with the cloud database nodes to obtain results corresponding to the request. In an embodiment of the present invention, the cloud database server 110, 112 provides a mechanism for high availability and high performance of the cloud database nodes by replicating data across the various cloud database nodes. The cloud database server 110, 112 further provides a mechanism for data distribution across various cloud database nodes, and for handling data storage and data retrieval from the client database nodes.

The cloud database node 114, 116, 118, 120 is a distributed node that provides underlying storage along with a processing engine to handle data storage and retrieval requests at the node level. In an embodiment of the present invention, the nodes include a virtual machine with an appropriate operating system. In another embodiment of the present invention, the nodes also include a software image along with software stack to enable virtual appliances that can be instantiated and can be turned off/shutdown on demand. In an embodiment of the present invention, the cloud database nodes use a query engine (not shown) such as an Off the Shelf JPA implementation to process various requests and provide corresponding results. In an embodiment of the present invention, the query engine (not shown) is configured with an object-relational mapping module (not shown) to process various requests and provide corresponding results. In an exemplary embodiment of the present invention, open source hibernate framework may be used as a query engine which uses configuration files to map objects to database tables. The cloud database node 114, 116, 118, 120 also updates versioning information related to replicated data across the various cloud database nodes 114, 116, 118, 120.

Figure 2:
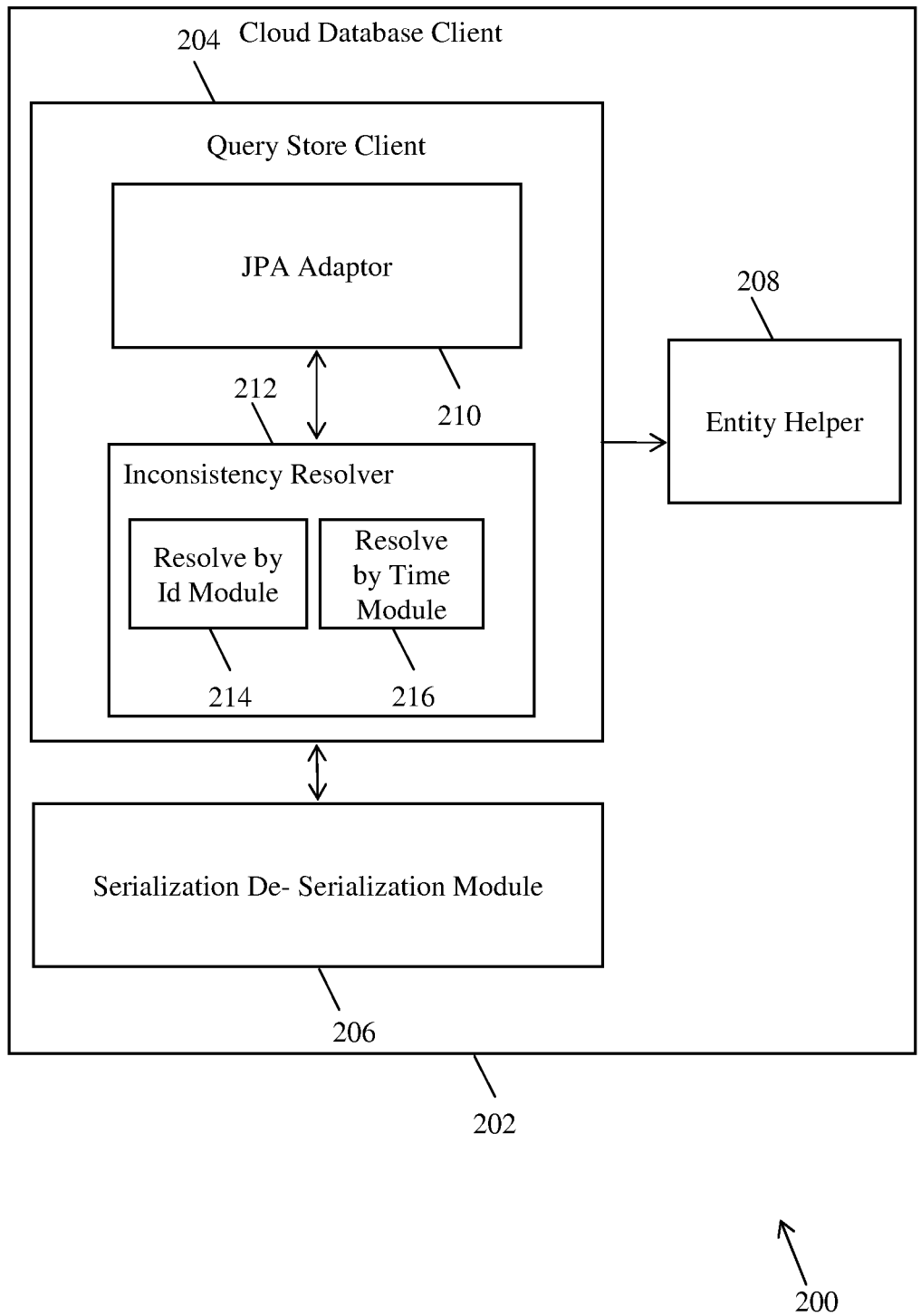
FIG. 2 illustrates a detailed block diagram of the cloud database client in accordance with an embodiment of the present invention.

FIG. 2 illustrates a detailed block diagram of the cloud database client in accordance with an embodiment of the present invention. In various embodiments of the present invention, the cloud database client 202 comprises Query Store Client 204, Serialization De-Serialization module 206, and Entity Helper 208. The Query Store Client 204 further comprises a JPA Adaptor 210 and Inconsistency Resolver 212. The Inconsistency Resolver 212 further comprises a Resolve by Identification (Id) module 214 and Resolve by Time module 216.

The Query Store Client 204 comprises a Java Persistence API (JPA) Adaptor 210 that provides a JPA query interface for processing request to store, retrieve, update and delete entities. The JPA query interface details are available as part of Java Specification Request (JSR). In an embodiment of the present invention, the Query Store Client 204 receives requests from a user to store, update, delete or retrieve entities stored in various cloud database nodes and captures the request in a query object.

The Serialization De-Serialization module 206 serializes the query object for sending to a cloud database server over a network. In an embodiment of the present invention, serialization is the process of translating an object into a sequence of bits so that it can be stored on a storage medium or transmitted across a network link to be used in another networking environment. In another embodiment of the present invention, the Serialization De-Serialization module 206 enables distributed deployment of various modules of the cloud database client 202.

The Inconsistency Resolver 212 within the Query Store Client 204 resolves inconsistencies in results retrieved from the cloud database server. Different versions of a particular entity are provided by different cloud database nodes and each of the versions are associated with version identification numbers. In an embodiment of the present invention, the Resolve by Id module 214 uses the version identification numbers to identify latest version of the entity and replaces all the cloud database nodes which have an older version of the entity. The Resolve by Id module 214, therefore, enables resolving inconsistencies by updating version identification number associated with the cloud database. The Resolve by Time module 216 uses last modified time information stored along with an entity to identify latest version when multiple inconsistent copies of an entity are stored among different cloud database nodes. The Inconsistency Resolver 212 facilitates integrity and consistency of entities.

The Entity Helper 208 provides all configuration and additional information about an entity which otherwise cannot be stored in a primary storage repository of the entity.

Figure 3:
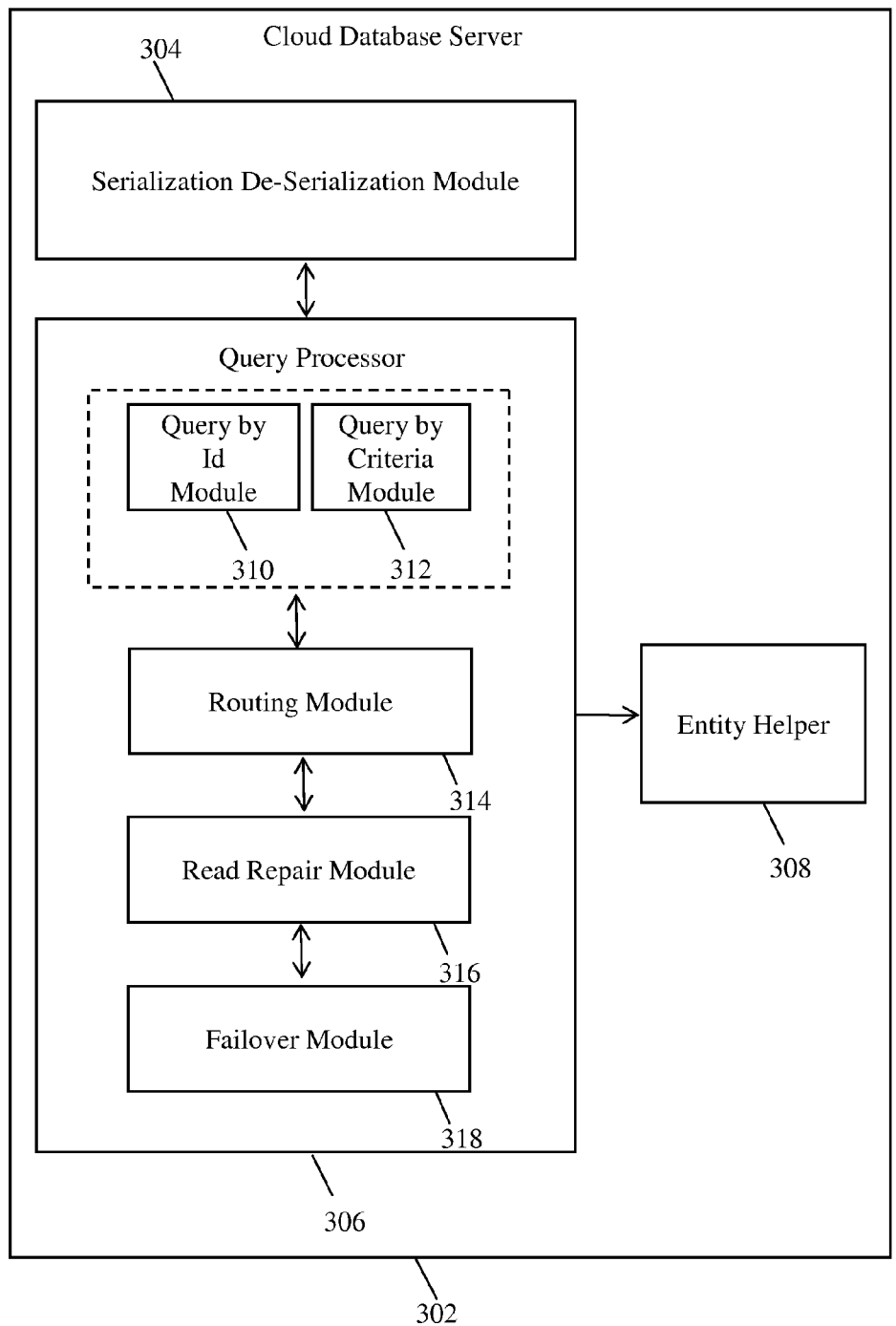
FIG. 3 illustrates a detailed block diagram of a cloud database server in accordance with an embodiment of the present invention.

FIG. 3 illustrates a detailed block diagram of a cloud database server in accordance with an embodiment of the present invention. The cloud database server 302 comprises Serialization-De-serialization module 304, Query Processor 306, and Entity Helper 308. The Query Processor 306 further comprises a Query by Identification (Id) module 310, Query by Criteria module 312, Routing module 314, Read Repair module 316 and Failover module 318.

The Serialization De-Serialization module 304 receives requests over the network from the cloud database client. The requests are in a serialized format, which is deserialized for further processing. Further, the Serialization De-Serialization module 304 serializes result data corresponding to the request and sends it to the cloud database client.

The Query Processor 306 interprets the requests received and processes them in accordance with an embodiment of the present invention. In an embodiment of the present invention, the requests provided by the users may be processed by the Query by Id module 310. Query by Id module 310 is used when identity of an entity associated with the query is known. In another embodiment of the present invention, the queries provided by the users may be processed by the Query by Criteria module 312. Query by Criteria module 312 is used when identity of an entity associated with the query is not known and only a few characteristics of the entity are known. Using the few characteristics selection criteria is created and the Query by Criteria module 312 operates on a group of entities selected based on the selection criteria to identify and retrieve the requested entity. The requests forwarded by the users are received by the Query Processor 306 which is further interpreted and provided to a corresponding cloud database node or to various other cloud database node instances via corresponding cloud database server instances.

Routing Module 314 partitions entities across one or more instances of cloud database server nodes (existing and provisioned nodes) and routes requests to the appropriate cloud database server node. This reduces amount of data stored on a particular node and further reduces time required to process requests and provide results. In an embodiment of the present invention, when a request is received for multiple entities, the first cloud database server node which receives the request, routes the requests to various other cloud database server nodes. The first cloud database server node, then, receives and aggregates the results received from the various cloud database server node instances. In yet another embodiment of the present invention, the Routing Module 314 may replicate an entity across multiple cloud database node instances to ensure that related entities are stored, thus, providing high availability of entities. In another embodiment of the present invention, the Routing module 314 maintains data store constraint checks that may be executed to ensure consistency of relationships across the entities stored in the cloud database nodes. In an exemplary embodiment of the present invention, a pluggable replication algorithm may be used for replicating the entities. In another embodiment of the present invention, the entities may be versioned using known versioning techniques which in turn provide consistency and availability of entities.

The Read Repair Module 316 performs repairs on versioned entities when it finds inconsistencies in the replicated entities retrieved from the cloud database server instances. In an embodiment of the present invention, the Read Repair Module 316 is used to update cloud database nodes which have outdated information on an entity. The Failover Module 318 handles scenarios when the cloud database server is turned off shut down or restored at the time of processing of the query object.

The Entity Helper 308 is used to maintain information about the entity relationships so that related entities are routed to the same cloud database server node instances. The Entity Helper 308 provides information about entity types that are related to each other and entities that are used by the Routing Module 314 to ensure that related entities are stored in same cloud database node.

FIG. 4 is a flowchart illustrating a method for dynamic management of one or more cloud database nodes and routing of requests to the one or more cloud database nodes, in accordance with an embodiment of the present invention.

At step 402, information on current usage of one or more cloud database nodes is gathered. In an embodiment of the present invention, information on current usage of the one or more cloud database nodes include identifying number of entities stored in the one or more cloud databases. In another embodiment of the present invention, the information on current usage of the one or more cloud database nodes include identifying number of request received at the one or more cloud database nodes. The requests may include requests to store entities and request to retrieve entities.

At step 404, information on future usage of the one or more cloud database nodes is gathered. In an embodiment of the present invention, information on future usage of the one or more cloud database nodes include forecasting the number of entities that can be stored in the one or more cloud databases. In another embodiment of the present invention, information on future usage of the one or more cloud database nodes include forecasting number of requests that are expected to be received at the one or more cloud database nodes. In an embodiment of the present invention, the forecasting may be based on past information of number of entities stored, requests to retrieve or store entities. Forecasting techniques such as ARIMA (Auto-Regressive Integrated Moving Average) may be used to perform the predictions based on the past information. In an embodiment of the present invention, forecasting and prediction enables optimizing distribution of entities across the different cloud database nodes based on considerations such as performance of retrieval, cost of storage etc. depending on forecasted usage.

At step 406, a check is performed to determine if the time required for servicing one or more requests by the one or more cloud databases is less than or more than a predetermined threshold. In an embodiment of the present invention, the predetermined threshold includes response time threshold. In another embodiment of the present invention, the predetermined threshold includes throughput threshold. In yet another embodiment of the present invention, the predetermined threshold includes resource utilization threshold. In an embodiment of the present invention, techniques such as queuing theory may be used to determine the amount of time that is taken by the cloud databases to service one or more requests for storage or retrieval of entities. In an embodiment of the present invention, queuing theory facilitates to predict computing resource requirements for different storage transactions. This information is used to optimize allocation of computing resources to different cloud database nodes and also in the allocation of workloads to the different cloud database nodes.

At step 408, one or more new instances of cloud database nodes and cloud database servers are provisioned or removed using a cloud provider application programming interface (API). In an embodiment of the present invention, the cloud provider application API uses the information related to number of entities that can be stored in the one or more cloud databases to provision the one or more new instances of cloud database nodes. In another embodiment of the present invention, the cloud provider application API uses the number of requests for storage or retrieval of entities that are expected to be received at the one or more cloud database to provision the one or more new instances of cloud database nodes. The cloud provider application API therefore facilitates addition and removal of cloud database nodes dynamically using the abovementioned information. Further, dynamic distribution of entities and workloads to different cloud database nodes enables optimizations in computing resource allocation and also provides ability to scale dynamically depending on usage of the cloud database nodes.

At step 410, routing module is updated with information related to the provisioning or removal of the one or more cloud database nodes. In an embodiment of the present invention, addition and deletion of cloud database nodes at runtime facilitates dynamic routing. This enables the cloud database architecture to scale up and down easily which further enables cost optimizations as well as ability to meet service levels.

At step 412, requests are routed to cloud database nodes via cloud database server instances based on the updated information. In various embodiments of the present invention, entities stored in the one or more cloud database nodes is repartitioned into one or more segments and distributed by the routing module to existing and/or newly provisioned cloud database nodes. The data is repartitioned appropriately to ascertain that the entities are evenly distributed across the various cloud database node instances. In an exemplary embodiment of the present invention, consistent hashing of primary keys associated with the entities may be performed to evenly distribute entities across the various cloud database instances. Consistent hashing is a mechanism where hash function of a primary key is created and is used to identify cloud database node to which the entity is routed. The hash function is consistent and any user who has the entity's primary key and the hash function can determine the cloud database node on which the entity with that primary key would get stored. The routing module, therefore, need not maintain a mapping of the entity to corresponding cloud database nodes.

In an embodiment of the present invention, information related to entity relationships is maintained so that related entities are routed to the same cloud database node instances. In another embodiment of the present invention, one or more entities may be replicated across all the cloud database node instances in order to maintain consistency of the entity relationships in the cloud database node instances. For example, when there are two entity types that are related to each other, information regarding which entity's primary key should be used and how to retrieve primary key of each of the entities is provided as input to the consistent hashing mechanism. This will result in both the entities getting routed to the same cloud database node. Further, the requests related to storage or retrieval of entities is routed to the existing and/or newly provisioned cloud databases suitably.

FIG. 5 is a flowchart illustrating a method for interacting with cloud database implementation that supports standard application programming interface (API), in accordance with an embodiment of the present invention.

At step 502, request data is received. In various embodiments of the present invention, request data is received by a cloud database client. The request data may include, request for storing entities in the cloud database, retrieving entities stored in the cloud database, updating entities stored in the cloud database, and deleting entities stored in the cloud database.

At step 504, the request data is converted to a standard query language format. In various embodiments of the present invention, the request data is converted to a standard query language format by a query interface which is a standard Application Programming Interface (API). In an embodiment of the present invention, the standard API may include a Java Persistence API (JPA) query interface. The JPA query interface captures the request data in a query object. Query object is a query language standard for object orientated databases.

At step 506, one or more cloud database server instances are located. In various embodiments of the present invention, the cloud database client locates one or more cloud database server instances. The one or more cloud database server instances include existing and newly provisioned cloud database server instances as explained in FIG. 4. In an embodiment of the present invention, static configuration mechanisms may be employed to locate the one or more cloud database server instances. In an exemplary embodiment of the present invention, static configuration may be a property file having location information of the cloud database server instances which is used by the cloud database client to locate the cloud database server instances. In another embodiment of the present invention, dynamic discovery mechanisms such as multi-cast may be employed to locate the one or more cloud database server instances. In an embodiment of the present invention, dynamic discovery mechanism includes sending a multi-cast request on a pre-defined port. One or more cloud database server instances listening on the multi-cast port respond with details of their location and the cloud database client locates the one or more cloud database server instances.

At step 508, the converted data is sent to one of the cloud database server instance. In various embodiments of the present invention, the converted data is sent to at least one of the cloud database server instance over a network. In an embodiment of the present invention, the converted data is serialized to translate the converted data into a sequence of bits so that the data can be stored in a file or a memory buffer or transmitted across a network in a computing environment.

At step 510, query object is interpreted and processed. In various embodiments of the present invention, the serialized data sent over the network is received by the cloud database server instance and further the serialized data is deserialized to obtain the converted data. The converted data includes the query object. The cloud database server instance, then, interprets the query object which is further processed. In an embodiment of the present invention, the query object is processed to determine one or more cloud database node instances where one or more entities can be stored or retrieved and route the request data to the appropriate cloud database node through corresponding cloud database server instances. The cloud database server instances may include both existing and provisioned cloud database server instances (as explained in FIG. 4). In an embodiment of the present invention, the cloud database server instance uses configuration information to replicate the one or more entities across one or more cloud database node instances. In an embodiment of the present invention, the configuration information may include a property file that provides information regarding the number of times a particular entity has to be replicated among different cloud database nodes. This ascertains that the entity data is not lost even if one or more of the cloud database node instances does not function.

At step 512, the cloud database server instance sends the query object to its corresponding cloud database node instance or to other cloud database node instances through corresponding cloud database server instances. The cloud database node instances processes the query and sends the results of the query to the cloud database server instance.

At step 514, the cloud database server instance receives results from various other cloud database server instances and then processes the results. In an embodiment of the present invention, the cloud database server instance processes the results to amend problems which may arise due to inconsistent versions of entity data across various cloud database node instances. In another embodiment of the present invention, the cloud database server instance also handles scenarios when the cloud database server is turned off/shut down and also when the cloud database server is restored.

At step 516, the results are sent to the cloud database client. In various embodiments of the present invention, the cloud database server instance sends the results to the cloud database client. In an embodiment of the present invention, the cloud database server and the cloud database client resolves inconsistencies which may arise due to replicated entities across the one or more cloud database node instances using techniques such as, but not limited to, versioning.

The present invention may be implemented in numerous ways including as an apparatus, method, or a computer program product such as a computer readable storage medium or a computer network wherein programming instructions are communicated from a remote location.

While the exemplary embodiments of the present invention are described and illustrated herein, it will be appreciated that they are merely illustrative. It will be understood by those skilled in the art that various modifications in form and detail may be made therein without departing from or offending the spirit and scope of the invention as defined by the appended claims.

We claim:

1. A method for interacting with dynamically scaled cloud database architecture, the method comprising the steps of:
   receiving one or more requests by a cloud database client;
   converting the one or more requests to a query language format;
   locating one or more cloud database server instances;
   sending the one or more converted requests to at least one of the located cloud database server instance;
   processing the one or more converted requests at the located cloud database server instance, the processing comprising:
   interpreting the one or more converted requests based on: entity identifications associated with the converted requests and creation of selection criteria based on one or more characteristics of entities associated with the converted requests for selecting a group of entities, if the entity identifications associated with the converted requests are not identified;

identifying one or more entities corresponding to the one or more converted requests based on the interpretation;

determining one or more cloud database node instances that store the identified entities;

routing the one or more converted requests to the determined one or more cloud database node instances, wherein the determined one or more cloud database node instances comprises at least one of: one or more cloud database node instances storing related entities corresponding to the identified entities and one or more cloud database node instances storing replicated entities corresponding to the identified entities;

receiving, at the located cloud database server instance, one or more results from the determined one or more cloud database node instances, wherein the one or more results comprise the identified entities; and sending the one or more results to the cloud database client.

2. The method of claim 1, wherein converting the one or more requests to a query language format comprises capturing the one or more requests in a query object.

3. The method of claim 1, wherein locating the one or more cloud database server instances comprises locating at least one of: existing cloud database server instances and provisioned cloud database server instances.

4. The method of claim 1, wherein sending the converted requests to at least one of the located cloud database server instance comprises serializing the converted requests into a sequence of bits.

5. The method of claim 4, wherein processing the one or more converted requests at the cloud database server instance comprises deserializing the sequence of bits to obtain the converted requests.

6. The method of claim 1, wherein routing the one or more converted requests to the determined one or more cloud database node instances comprises routing the one or more requests to the determined one or more cloud database node instances via one or more other cloud database server instances.

7. The method of claim 1, wherein receiving results from the one or more cloud database node instances comprises aggregating results corresponding to the one or more converted requests received from the one or more cloud database node instances.

8. A system for facilitating interaction with dynamically scaled cloud database architecture, the system comprising:

a cloud database client in communication with a processor and configured to receive and convert one or more requests to a query language format;

a cloud database server in communication with a processor and configured to receive the query language format from the cloud database client and process the query language format to:

interpret the one or more converted requests based on: entity identifications associated with the converted requests and creation of selection criteria based on one or more characteristics of entities associated with the converted requests for selecting a group of entities, if the entity identifications associated with the converted requests are not identified;

identify one or more entities corresponding to the one or more converted requests based on the interpretation; and determine one or more cloud database node instances that store the identified entities, the cloud database server comprising:

a routing module in communication with a processor and configured to route the one or more converted requests to the determined one or more cloud database node instances, wherein the determined one or more cloud database node instances comprises at least one of: one or more cloud database node instances storing related entities corresponding to the identified entities and one or more cloud database node instances storing replicated entities corresponding to the identified entities;

and the one or more cloud database node instances in communication with a processing engine and configured to provide one or more results to the cloud database client corresponding to the one or more converted requests via at least one of the cloud database server and other cloud database server instances, the results being the identified entities.

9. The system of claim 8, wherein the cloud database client comprises a query store client that receives and converts the one or more requests to a query language format using a Java Persistence API (Application Programming Interface) Adaptor.

10. The system of claim 8, wherein the cloud database client comprises a Serialization De-Serialization module configured to:

translate the one or more converted requests into a sequence of bits; and send the sequence of bits to the cloud database server over a network.

11. The system of claim 8, wherein the cloud database client comprises an Inconsistency Resolver configured to resolve inconsistencies in the one or more results received from the cloud database server.

12. The system of claim 11, wherein the Inconsistency Resolver comprises a Resolve by Identification (Id) module configured to resolve inconsistencies in the one or more results by updating version identification numbers associated with the entities stored in the one or more cloud database node instances.

13. The system of claim 11, wherein the Inconsistency Resolver comprises a Resolve by Time module configured to resolve inconsistencies in the one or more results by identifying latest version of entities stored in the one or more cloud database node instances based on modified time information associated with the entities.

14. The system of claim 8, wherein the cloud database server is configured to send the one or more requests to one or other cloud database server instances.

15. The system of claim 8, wherein the cloud database server comprises a Query Processor configured to interpret the one or more converted requests.

16. The system of claim 15, wherein the Query Processor comprises Query by Identification module configured to interpret the one or more converted requests based on the entity identifications associated with the converted requests.

17. The system of claim 15, wherein the Query Processor comprises Query by Criteria module configured to interpret the one or more requests based on the selection criteria for the entities created based on the one or more characteristics of the one or more converted requests.

18. The system of claim 8, wherein the routing module is configured to reparation entities across one or more of the existing and provisioned cloud database node instances.

19. A computer program product comprising:
a non-transitory computer-readable medium having computer-readable program code stored thereon, the computer-readable program code having program instructions, when executed by one or more processors, cause the one or more processors to:
receive one or more requests by a cloud database client;
convert the one or more requests to a query language format;
locate one or more cloud database server instances;
send the one or more converted requests to at least one of the located cloud database server instance;
process the one or more converted requests at the located cloud database server instance, wherein the processing comprises:
interpreting the one or more converted requests based on: entity identifications associated with the converted requests and creation of selection criteria based on one or more characteristics of entities associated with the converted requests for selecting a group of entities, if the entity identifications associated with the converted requests are not identified;
identifying one or more entities corresponding to the one or more converted requests based on the interpretation;
determining one or more cloud database node instances that store the identified entities;
route the one or more converted requests to the determined one or more cloud database node instances, wherein the determined one or more cloud database node instances comprises at least one of: one or more cloud database node instances storing related entities corresponding to the identified entities and one or more cloud database node instances storing replicated entities corresponding to the identified entities;
receive the one or more results from the determined one or more cloud database node instances, wherein the one or more results comprise the identified entities; and
send the one or more results to the cloud database client.

20. The system of claim 19, wherein the cloud database server further comprises an entity helper in communication with the processor and configured to maintain information regarding relationship among related entities which are partitioned and stored across the cloud database instances.

* * * * *